(12) United States Patent
Scholz et al.

(10) Patent No.: US 9,213,767 B2
(45) Date of Patent: Dec. 15, 2015

(54) METHOD AND SYSTEM FOR CHARACTERIZING WEB CONTENT

(75) Inventors: Martin B. Scholz, San Francisco, CA (US); Shyam Sundar Rajaram, Mountain View, CA (US); Rajan Lukose, Oakland, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 481 days.

(21) Appl. No.: 12/538,405

(22) Filed: Aug. 10, 2009

(65) Prior Publication Data

US 2011/0035378 A1 Feb. 10, 2011

(51) Int. Cl.
*G06F 17/30* (2006.01)

(52) U.S. Cl.
CPC ...... *G06F 17/30867* (2013.01); *G06F 17/3071* (2013.01)

(58) Field of Classification Search
USPC .................................. 707/E17.044, E17.108
See application file for complete search history.

(56) References Cited

U.S. PATENT DOCUMENTS

| | | | |
|---|---|---|---|
| 6,292,792 B1 | 9/2001 | Baffes | |
| 6,385,619 B1 | 5/2002 | Eichstaedt | |
| 6,519,602 B2 | 2/2003 | Sundaresan | |
| 6,697,824 B1 | 2/2004 | Bowman-Amuah | |
| 6,701,333 B2 | 3/2004 | Suermondt | |
| 6,839,680 B1 | 1/2005 | Liu et al. | |
| 6,947,936 B1 | 9/2005 | Suermondt | |
| 6,990,485 B2 | 1/2006 | Forman | |
| 7,013,289 B2 | 3/2006 | Horn | |
| 7,028,261 B2 | 4/2006 | Smyth | |
| 7,043,468 B2 | 5/2006 | Forman | |
| 7,401,087 B2 | 7/2008 | Copperman | |
| 7,430,561 B2 * | 9/2008 | Bailey et al. | ........................ 1/1 |
| 7,516,397 B2 | 4/2009 | Joshi | |
| 7,734,632 B2 * | 6/2010 | Wang | ............................ 707/749 |
| 2003/0101449 A1 | 5/2003 | Bentolila et al. | |
| 2006/0026163 A1 | 2/2006 | Forman | |
| 2006/0026190 A1 | 2/2006 | Fortnan | |
| 2007/0240037 A1 | 10/2007 | Law-How-Hung | |
| 2008/0126176 A1 | 5/2008 | Iguchi | |

OTHER PUBLICATIONS

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.

(Continued)

*Primary Examiner* — Son T Hoang (74) *Attorney, Agent, or Firm* — International IP Law Group, PLLC (57) ABSTRACT

An exemplary embodiment of the present invention provides a method of processing Web activity data. The method includes obtaining a database of Website organizational data. The method also includes generating a data structure from the database of Website organizational data comprising an Item identifier and a Website category corresponding to the item identifier. The method also includes generating a reduced-rank classification structure from the data structure, the reduced-rank classification structure including a category grouping corresponding to one or more of the Website categories.

17 Claims, 6 Drawing Sheets

| | Website 1 | | | | Website 2 | | | | |
|---|---|---|---|---|---|---|---|---|---|
| | iPod | Zune | MP3 player | consumer electronics | MP3 | Apple | iPod | Microsoft | Zune |
| Item 1 | 1 | | 1 | 1 | 1 | 1 | 1 | | |
| Item 2 | | 1 | 1 | 1 | 1 | | | 1 | 1 |
| Item 3 | | 1 | 1 | 1 | 1 | | | 1 | 1 |
| Item 4 | 1 | | 1 | 1 | 1 | 1 | 1 | | |
| Item 5 | 1 | | 1 | 1 | 1 | 1 | 1 | | |
| Item 6 | | | 1 | 1 | 1 | | | | |
| Item 7 | | | | 1 | | | | | |
| Item 8 | 1 | | 1 | 1 | 1 | 1 | 1 | | |

(56) References Cited

OTHER PUBLICATIONS

Baynote Inc.: "The Collective Intelligence Platform," Online, http://www.baynote.com/technology/platform/ 2010.

Hottolink Inc.; "Recognize" Online, http://www.hottolink.co.jp/english/reconize.html, 2009.

Andrejko et al.: "User Characteristics Acquisition from Logs with Semantics" 8. Slovak University of Technology in Bratislava.

Hongjun Lu et al: "Extending a Web Browser with Client-Side Mining," Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India, 2008.

Shahabi et al.; "Yoda An Accurate and Scalable Web based Recommendation System?" University of Southern California, Los Angeles, Sep. 2001.

Why Wubat? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking," 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

Dhillon, Inderjit S., "A Divisive Information-Theoretic Feature Clustering Algorithm for Text Classification," Journal of Machine Learning Research 3, pp. 1265-1287, Mar. 2003.

Dhillon, Inderjit S., "Information-Theoretic Co-clustering," SIGKDD '03, Washington, D.C., Aug. 24-27, 2003.

Bekkerman, Ron, "Data Weaving: Scaling Up the State-Of-The-Art in Data Clustering," ACM CIKM, Conference on Information & Knowledge Management, Napa, CA, Oct. 27, 2008.

Gabrilovich, Evgeniy, "Wikipedia-based Semantic Interpretation for Natural Language Processing," Journal of Artificial Intelligence Research 34, pp. 443-498, Mar. 2009.

Gabrilovich, Evgeniy, "Classifying Search Queries Using the Web as a Source of Knowledge," ACM Transactions on the Web, vol. 3, Issue 2, pp. 1-28 (2009).

* cited by examiner

|        | Website 1 |      |            |                      | Website 2 |       |      |           |      |
|--------|-----------|------|------------|----------------------|-----------|-------|------|-----------|------|
|        | iPod      | Zune | MP3 player | consumer electronics | MP3       | Apple | iPod | Microsoft | Zune |
| Item 1 | 1         |      | 1          | 1                    | 1         | 1     | 1    |           |      |
| Item 2 |           | 1    | 1          | 1                    | 1         |       |      | 1         | 1    |
| Item 3 |           | 1    | 1          | 1                    | 1         |       |      | 1         | 1    |
| Item 4 | 1         |      | 1          | 1                    | 1         | 1     | 1    |           |      |
| Item 5 | 1         |      | 1          | 1                    | 1         | 1     | 1    |           |      |
| Item 6 |           |      | 1          | 1                    | 1         |       |      |           |      |
| Item 7 |           |      |            | 1                    |           |       |      |           |      |
| Item 8 | 1         |      | 1          | 1                    | 1         | 1     | 1    |           |      |

METHOD AND SYSTEM FOR CHARACTERIZING WEB CONTENT

BACKGROUND

Marketing on the World Wide Web (the Web) is a significant business. Users often purchase products through a company's Website. Further, advertising revenue can be generated in the form of payments to the host or owner of a Website when users click on advertisements that appear on the Website. The amount of revenue earned through Website advertising and product sales may depend on the Website's ability to provide marketing material or other Web content that is targeted to a specific user ID, based on the interests associated with the user ID. A user ID is a unique identifier used to identify a particular system used to access a Website, for example, an IP address, a user name, and the like. Providing targeted Web content may depend on the ability to generate a useful user profile.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Exemplary embodiments of the present invention provide techniques for aggregating a plurality of site-specific taxonomies or tag sets into one classification structure. As used herein, the term "exemplary" merely denotes an example that may be useful for clarification of the present invention. The examples are not intended to limit the scope, as other techniques may be used while remaining within the scope of the present claims.

The classification structure may be used to build user profile information that is useful across a wide range of websites. In exemplary embodiments of the present invention, a reduced-rank classification structure may be generated from an item/category matrix containing the taxonomies or tag structures (e.g., hyper text markup language (HTML) or extensible markup language (XML) based tag structures) of a plurality of websites. The item/category matrix may be processed to group the categories according to the similarities between the categories. In some exemplary embodiments, the reduced-rank classification structure is a singular-value decomposition (SVD) of the original item/category matrix. The SVD of the original item/category matrix condenses the matrix into the reduced-rank classification structure, wherein similar categories may be condensed into one. The reduced-rank classification structure may be used to build user profiles that use a classification structure that is common to several websites. Additionally, the reduced-rank classification structure may be processed to generate a close approximation of the original item/category matrix. In this way, a site-specific taxonomy may be re-generated from the reduced-rank classification structure.

Figure 1:
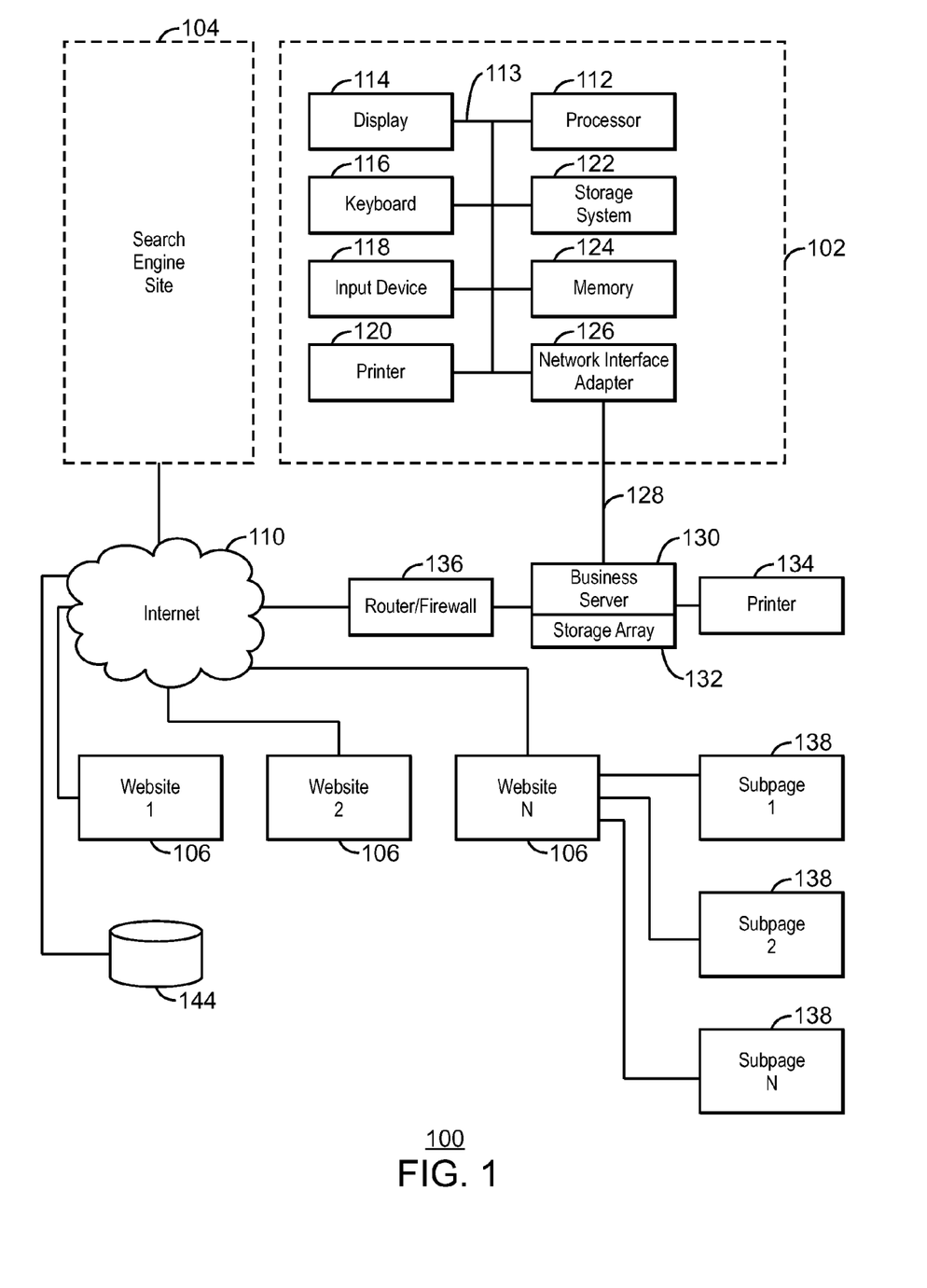
FIG. 1 is a block diagram of a computer network in which a client system can access a search engine and Websites over the Internet, in accordance with exemplary embodiments of the present invention.

FIG. 1 is a block diagram of a computer network 100 in which a client system 102 can access a search engine 104 and Websites 106 over the Internet 110, in accordance with exemplary embodiments of the present invention. As illustrated in FIG. 1, the client system 102 will generally have a processor 112 which may be connected through a bus 113 to a display 114, a keyboard 116, and one or more input devices 118, such as a mouse or touch screen. The client system 102 can also have an output device, such as a printer 120 connected to the bus 113.

The client system 102 can have other units operatively coupled to the processor 112 through the bus 113. These units can include tangible, machine-readable storage media, such as a storage system 122 for the long-term storage of operating programs and data, including the programs and data used in exemplary embodiments of the present techniques. The storage system 122 may also store a user profile generated in accordance with exemplary embodiments of the present techniques. Further, the client system 102 can have one or more other types of tangible, machine-readable media, such as a memory 124, for example, which may comprise read-only memory (ROM), random access memory (RAM), or hard drives in a storage system 122. In exemplary embodiments, the client system 102 will generally include a network interface adapter 126, for connecting the client system 102 to a network, such as a local area network (LAN 128), a wide-area network (WAN), or another network configuration. The LAN 128 can include routers, switches, modems, or any other kind of interface device used for interconnection.

Through the LAN 128, the client system 102 can connect to a business server 130. The business server 130 can also have machine-readable media, such as storage array 132, for storing enterprise data, buffering communications, and storing operating programs for the business server 130. The business server 130 can have associated printers 134, scanners, copiers and the like. The business server 130 can access the Internet 110 through a connected router/firewall 136, providing the client system 102 with Internet access. The business network discussed above should not be considered limiting as any number of other configurations may be used. Any system that allows the client system 102 to access the Internet 110 should be considered to be within the scope of the present techniques.

Through the router/firewall 136, the client system 102 can access a search engine 104 connected to the Internet 110. In exemplary embodiments of the present invention, the search engine 104 can include generic search engines, such as GOOGLE™, YAHOO®, BING™, and the like. The client system 102 can also access the Websites 106 through the Internet 110. The Websites 106 can have single Web pages, or can have multiple subpages 138. Although the Websites 106 are actually virtual constructs that are hosted by Web servers, they are described herein as individual (physical) entities, as multiple Websites 106 may be hosted by a single Web server and each Website 106 may collect or provide information about particular user IDs. Further, each Website 106 will generally have a separate identification, such as a uniform resource locator (URL), and function as an individual entity.

The Websites 106 can also provide search functions, for example, searching subpages 138 to locate products or publications provided by the Website 106. For example, the Websites 106 may include sites such as EBAY®, AMAZON-.COM®, WIKIPEDIA™, CRAIGSLIST™, FOXNEWS.COM™, and the like. Further, one or more of the Websites 106 may be configured to receive information from a visitor to the Website regarding interests related to the visitor's user ID, and the Website may use the information to determine the content to deliver to the user ID.

The client system 102 and Websites 106 may also access a database 144, which may, for example, be connected to an Internet service provider (ISP) on the Internet 110, and may be accessible to the client system 102 and one or more of the Websites 106. As used herein, a "database" is an integrated collection of logically related data that consolidates information previously stored in separate locations into a common pool of records that provide data for an application. The database 144 may include the taxonomies or tag structures of a plurality of websites, as described below in reference to FIG. 2. Further, the database 144 may include a reduced-rank classification structure generated by an automated statistical analysis of the taxonomies or tag structures, as described below in reference to FIG. 2. The reduced-rank classification structure may include a plurality of categories which correspond with the various subjects included in the taxonomies or tags. Furthermore, the reduced-rank classification structure may be used to generate a user profile that includes categories from the reduced-rank classification structure, as discussed with reference to FIG. 4. The user profile indicates a user ID's interests by describing, in terms of the reduced-rank classification structure, which parts (such as specific product categories) of a website the user ID has visited. Upon visiting another website the content of the Website may be determined, in part, based on the categories contained in the user profile.

Figure 2:
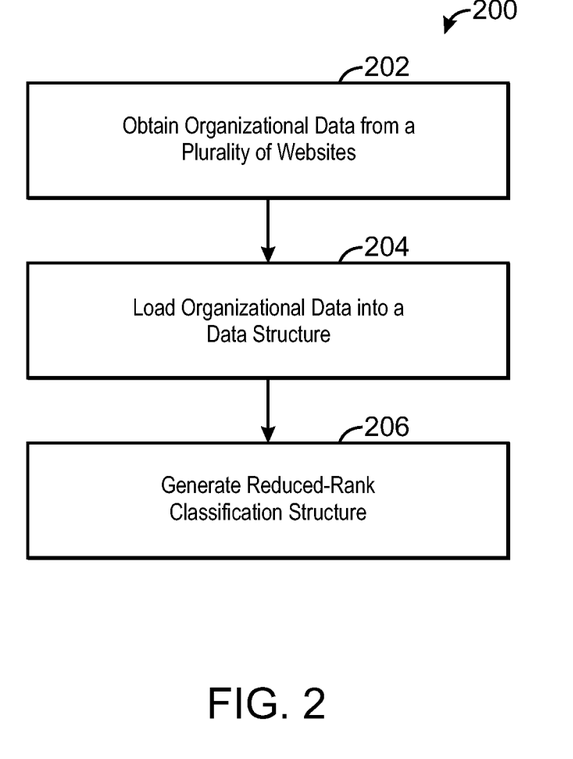
FIG. 2 is a process flow diagram of a method for generating a reduced-rank classification structure, in accordance with exemplary embodiments of the present invention.

FIG. 2 is a process flow diagram of a method for generating a reduced-rank classification structure, in accordance with exemplary embodiments of the present invention. Different combinations of the units referred to in FIG. 1 may be used to implement the method. For example, in some embodiments, the actions discussed below with respect to block 202-206 may be performed by a Website 106 (such as a content or advertising provider), a business server 130, an application server, or a search engine 104. In another exemplary embodiment, blocks 202-206 may be implemented by a client system 102 that is located at a particular user ID. In this embodiment, the Website organizational data may be collected by an internet service provider (ISP), a search engine 104, or a business server 130, among others, and retrieved for analysis by the client system 102. In other embodiments, the Website organizational data may be directly retrieved by the client system 102. One of ordinary skill in the art will recognize that the configurations above are not limiting, as any combination of the devices described with respect to FIG. 1 may be used to implement the various steps of the method.

The method is generally referred to by the reference number 200 and may begin at block 202, wherein organizational information related to a plurality of Websites is obtained. In exemplary embodiments, the organizational information may include a taxonomy of a Website, a tag structure of a Website, and the like. The organizational information may also include a list of items that are organized by the Website according to the organizational information. Each item may be represented by a unique identification code, for example, a SKU number, serial number, a UPC code, and the like. Each item from the list of items may be associated with a particular category of the taxonomy or a list of tags from the tag structure. For example, the organizational information may include an item X, which may be tagged as "IPOD®" and "MP3 player" on a Website A, and may be included under "consumer electronics→MP3→APPLE®→IPOD®" within the taxonomy of a Website B.

At block 204, the organizational information from the plurality of websites may be loaded into a data structure, for example, a matrix of items and website-specific categories. The reduced-rank classification structure may be generated by an automated analysis of the item/category matrix, for example, a matrix operation such as a singular value decomposition. An exemplary decomposition technique may be better understood with reference to FIG. 3.

Figure 3:
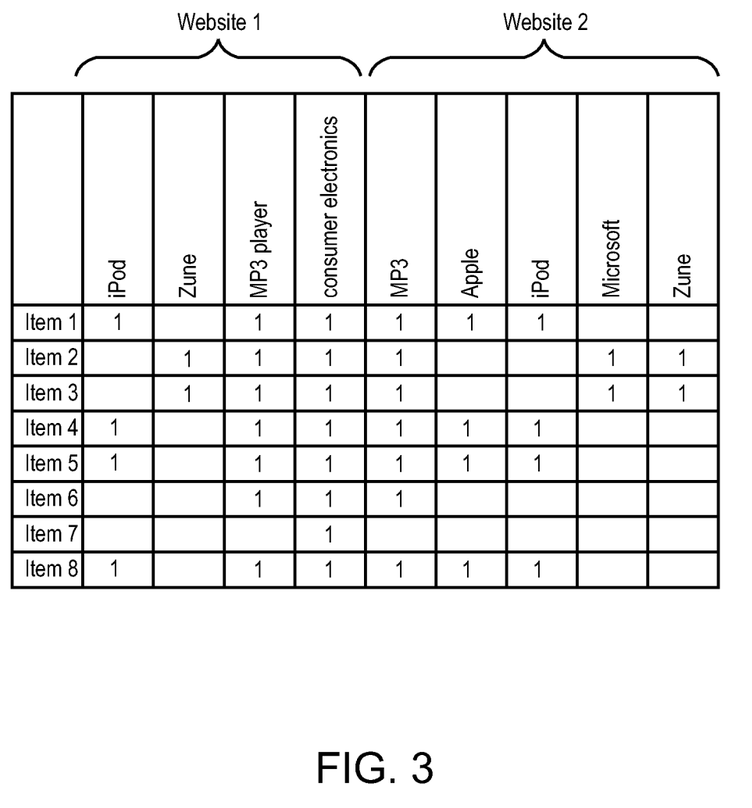
FIG. 3 is a graphical representation of an exemplary item/category matrix that may be used to generate the reduced-rank classification structure, in accordance with exemplary embodiments of the present invention.

FIG. 3 is a graphical representation of an exemplary item/category matrix that may be used to generate the reduced-rank classification structure, in accordance with an exemplary embodiment of the present invention. As shown in FIG. 3, the items from the organizational information may be distributed along rows, and the categories from the organizational information may be distributed along columns. Each matrix entry may be determined based on whether the item corresponds with the particular category. For example, if a particular item is represented in the website under a specific category, the matrix entry at the intersection of the item and the category will be set to one. All other matrix entries may be empty or set to zero. Additionally, in some cases there may be a degree of uncertainty as to whether a specific item corresponds with a specific category. For example, there may be website that does not (or not yet) offer a specific product. In that case, it is not clear where (if at all) in its product taxonomy the website would place the item. Therefore, in some exemplary embodiments, the matrix entry may be set to a value corresponding with the degree of uncertainty. It will be appreciated that the graphical representation of the item/category matrix of FIG. 3 is provided merely as an aid to explaining the invention. In actual practice, the item/category matrix may include several thousands of items and categories stored in a machine-readable medium and processed electronically.

Returning to FIG. 2, at block 206, the item/category matrix may be processed via matrix decomposition to generate the reduced-rank classification structure. Such matrix decomposition techniques may include singular value decomposition, LU decomposition, Cholesky decomposition, QR decomposition, Schur decomposition, and Eigenvalue decomposition, among others.

In an exemplary embodiment, the item/category matrix may be processed via singular value decomposition (SVD), according to the following formula:

$$M \cong U \cdot S \cdot V$$

Where M is the item/category matrix and the matrices U, S, and V represent the reduced-rank classification structure. The U matrix may correspond to the items, the S matrix may be a singular value matrix, and the V matrix may correspond to the category groupings. Furthermore, the U and V matrices may represent vectors within a latent vector space. The category groupings may be represented as locations in the latent vector space defined by the parameters of the V matrix. In this space, the proximity of the category groupings corresponds with the similarity of the subject matter represented by the category grouping.

In some exemplary embodiments, the matrix decomposition may be performed using the "Weighted Alternating Least Squares Algorithm." The Weighted Alternating Least Squares Algorithm is a regularized derivative of singular value decomposition that allows different weights to be assigned to different entries of the matrix M. For example, it might assign lower weight to the "0" entries, which has the effect of a lower penalty for not getting these values right. This reflects a lack of confidence that these values are in fact negative (that items do not belong to the corresponding categories), which can in fact be doubted in this setting, because the matrix M may be incomplete and not cover all the categories. The resulting matrices U, S, and V may be of lower rank than the original item/category matrix, meaning that there are fewer rows and columns in the U, S, and V matrices.

In the new reduced-rank classification structure, distinct categories within the item/category matrix may be merged into a category grouping, based on the similarity between the features. A category grouping refers to a set of categories from the item/category matrix that are close to one another within the latent vector space represented by the reduced-rank classification structure. For example, in FIG. 3 it can be seen that the categories "IPOD®" from Website 1 and "IPOD®" from Website 2 have the same distribution of item entries. Similarly, the categories "MP3 player" from Website 1 and "MP3" from Website 2 also have a similar distribution of row entries. Thus, after the matrix decomposition, the item "IPOD®" from Website I and Website 2 may be grouped into the same category grouping, and the item "MP3 player" from Website 1 and the item "MP3" from Website 2 may also be grouped within the same category grouping. In some exemplary embodiments, each category grouping may be defined as a vector average of the individual item/website categories. In this way, the reduced-rank classification structure may combine disparate classification structures into one common classification structure that is applicable to a wide range of Websites despite small differences in the wording of categories or the different tree structures of different taxonomies. Thus, the reduced-rank classification structure may be used to generate a user profile based on a visitation pattern at various Websites that use disparate organizational schemes. The user profile may be used to provide targeted Web content.

Referring also to FIG. 1, the reduced-rank classification structure may be available to a Website 106, for example, via the database 144. In exemplary embodiments of the present invention, the reduced-rank classification structure may be generated by a third party and provided to the Websites 106 via the Internet 110 as part of a subscription service, for example. In exemplary embodiments, the reduced-rank classification structure may be stored on a server of the Website 106. In other exemplary embodiments, the segment information may be stored on the database 144 and accessed by the Websites 106 through the Internet 110. Furthermore, the clustering information may be updated periodically, such as weekly, monthly, or yearly, among others.

Figure 4:
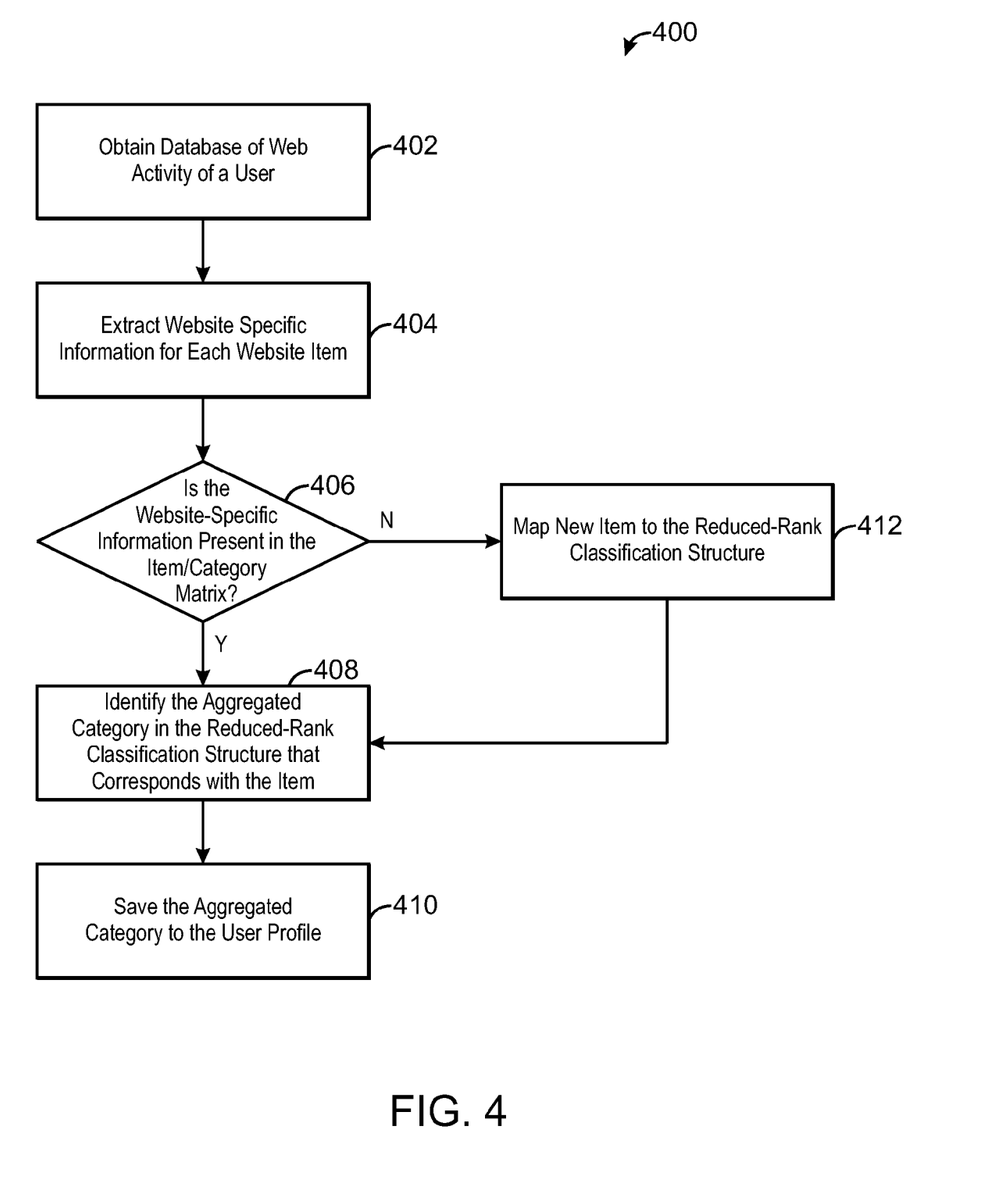
FIG. 4 is a process flow diagram of a method for generating a user profile using the reduce-rank classification structure, in accordance with exemplary embodiments of the present invention.

FIG. 4 is a process flow diagram of a method for generating a user profile based on the reduced-rank classification structure, in accordance with exemplary embodiments of the present invention. In exemplary embodiments of the present invention, the method of FIG. 4 may be performed by the client system 102 (FIG. 1), an ISP, or a specific Website 106. The method is generally referred to by the reference number 400 and may begin at block 402, wherein a database of Web activity, such as clickstream data, is obtained for a user ID.

The Web activity data may include a list of items which the user ID accessed. For example, the user ID may have caused to access an item by a user clicking on a Webpage featuring the item, purchasing the item through a Website, or performing a search query for the item. The Web activity data may also include a time stamp corresponding to the time that the user ID accessed the item.

At block, 404, Website-specific information for each item may be obtained. The Website may be analyzed to extract the tags, taxonomy terms, positions in the hierarchy of the taxonomy, and the like. At block 406, this website-specific information may be compared against the item/category matrix to determine if the item is already represented in the item/category matrix. If the item is present in the item/category matrix the method 400 may advance to block 408. Otherwise, the method may advance to block 412.

At block 408, the category grouping corresponding with the item may be identified. The item's representation in the item/category matrix may be used to determine the corresponding category grouping in the reduced-rank classification structure. In some embodiments, the category grouping may be identified by determining which category grouping is geometrically closest to the new item's vector representation. The resulting category grouping may be represented as a single vector in the latent vector space. Next, at block 410, the category grouping, e.g., the vector, may be saved to the user profile.

As stated above, if the item is not present in the item/category matrix, the method 400 may advance to block 412. At block 412 the new item may be added to the item/category matrix, M. Additionally, the new item may also be mapped to the latent vector space to determine the category grouping to which the new item is closest. To map the new item to the latent space, the category matrix, V, may be multiplied by the new row of the item/category matrix, M. After mapping the new item to the latent space the category grouping corresponding to the new item may be identified at block 408. The category grouping for the new item may be identified by determining which category grouping is geometrically closest to new item. Next, at block 410, the category grouping, e.g., the vector, may be saved to the user profile.

Additionally, at block 410, a time factor may be assigned to the category grouping and saved to the user profile. The time factor may include a time stamp indicating the date and/or time that the category grouping was added to the user profile. Alternatively, the time factor may include a time-decaying weighted vector that may be periodically adjusted to indicate an age of the category grouping entry. In the some exemplary embodiments, the time-decaying weighted vector may be periodically adjusted to decay exponentially over time. The time factor may be used to indicate the age of the entry. The method 400 may be repeated for each item in the Web activity data of the user ID. The resulting user profile may include vectors to the latent space for each of the items.

Figure 5:
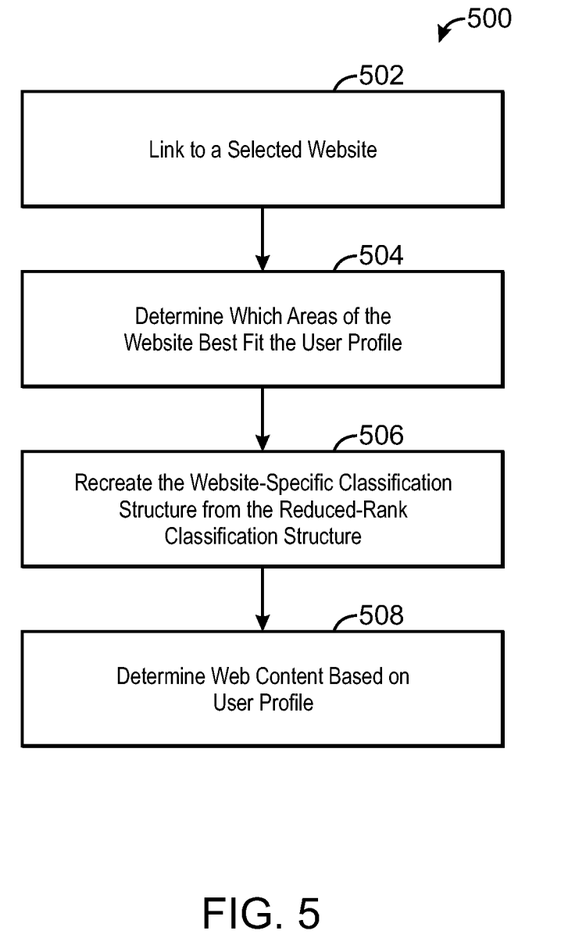
FIG. 5 is a process flow diagram of a method for using a user profile to determine content of a Website, in accordance with exemplary embodiments of the present invention.

FIG. 5 a process flow diagram showing a method for using a user profile to determine content of a Website, in accordance with exemplary embodiments of the present invention. The method is generally performed by a content provider, such as Website 106 of FIG. 1. The method is referred to by the reference number 500 and begins at block 502, when a user ID accesses a selected Website. The selected Website may be one of the Websites included in the lower-rank classification structure.

At block 504, a determination is made as to what tags or taxonomy attributes of the selected Website best fit the user profile. The category groupings stored in the user profile may be mapped to the latent vector space of the V matrix. Those category groupings in the V matrix that are spatially closer to the category groupings of the user profile may be selected as representative of the interests as reflected by the user ID.

At block 506, the Website-specific classification structure is recreated from the reduced-rank classification structure. In some embodiments, the Website-specific classification structure may be recreated using regression analysis of the reduced-rank classification structure, for example sparse regression. Furthermore, the regression analysis may be biased towards sparsity by using an L1 or L2 norm. Each particular website may correspond to a submatrix of the original item-category matrix M, which may contain all item rows (corresponding to the full matrix U in low-rank space), but only a subset of columns. Each user ID's profile vector may be characterized in low-rank space in terms of a linear combination of the subset of matrix V that corresponds to the categories that are supported by that website. In order to go back to the representation used by the Website, a linear combination of V* that approximates the profile vector may be identified. The regression analysis may generate one or more features, such as specific taxonomy categories or tags that correspond with the user ID's interests based on the user ID's previous Web activity.

Next, at block 508, the content of the Website may be determined based on the user profile. An automated process for generating personalized Web content may include determining content of a Web page based on the features provided by the regression analysis. In one exemplary embodiment, upon accessing the selected website, the user ID may automatically access a Web page that corresponds with one or more of the features determined by the regression analysis. In another exemplary embodiment, a Webpage may be customized based on the features. For example, an advertisement or a link to a Webpage corresponding with one of the features may be displayed to the user ID by the Website 106. In this way, different Website content may be provided to each user ID, depending on the specific interests of the user ID as indicated by the user profile. In view of the present specification, a person of ordinary skill in the art will recognize various other methods of using the low-rank classification system to determine the content of a Website 106.

Figure 6:
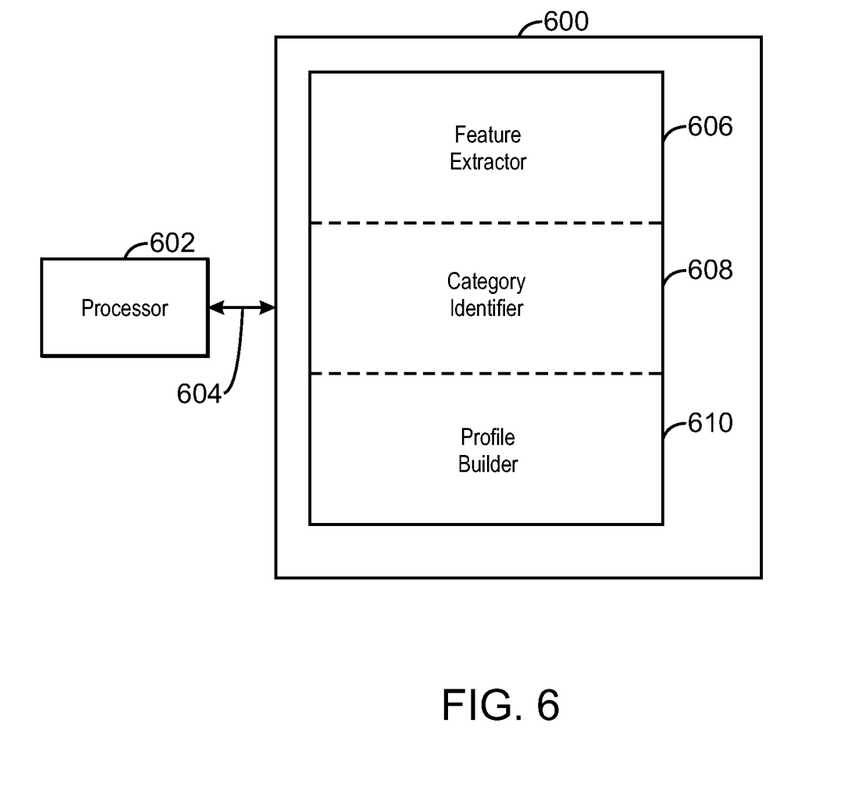
FIG. 6 is a block diagram showing a tangible, machine-readable medium that stores code configured to generate a user profile using the reduce-rank classification structure, in accordance with exemplary embodiments of the present invention.

FIG. 6 is a block diagram showing a tangible, machine-readable medium that stores code configure to generate a user profile using the reduce-rank classification structure, in accordance with an exemplary embodiment of the present invention. The tangible, machine-readable medium is referred to by the reference number 600. The tangible, machine-readable medium 600 can comprise RAM, a hard disk drive, an array of hard disk drives, an optical drive, an array of optical drives, a non-volatile memory, a universal serial bus (USB) drive, a digitally versatile disk (DVD), a compact disk (CD), and the like. Further, the tangible, machine-readable medium 600 may be located in a client system 102 (FIG. 1), a business server 103, a Website 106, or a search engine 104. In one exemplary embodiment of the present invention, the tangible, machine-readable medium 600 can be accessed by a processor 602 over a computer bus 604.

The various software components discussed herein can be stored on the tangible, machine-readable medium 600 as indicated in FIG. 6. For example, a first block 606 on the tangible, machine-readable medium 600 may store a feature extractor configured to obtain Website-specific categories corresponding to an item included in a database of Web activity data of a user ID. The feature extractor may obtain the Website specific categories from the database of Web activity data or from the Website listed in the Web activity data. A second block 608 can include a category identifier configured to identify a category grouping from the low-rank classification structure that corresponds with the Website-specific categories. In some exemplary embodiments, identifying the category grouping includes mapping a new Website's organizational data to the latent space of the reduced-rank classification structure and determining which category grouping is closer in proximity to the new Website's organizational data. A third block 610 can include a profile builder configured to add the category grouping to a user profile. The tangible, machine-readable medium 600 may also include other software components, for example, a taxonomy generator configured to generate an approximation of a Website-specific taxonomy or tag structure based on the reduced-rank classification structure. Although shown as contiguous blocks, the software components can be stored in any order or configuration. For example, if the tangible, machine-readable medium 600 is a hard drive, the software components can be stored in non-contiguous, or even overlapping, sectors.

What is claimed is:

1. A method of processing Web activity data, comprising:
   obtaining, by a computer processor, a database of Website organizational data at a networked computer from a plurality of Websites, the Website organizational data comprising a plurality of Website-specific category names and corresponding item identifiers, wherein each of the plurality of Website-specific category names is associated with one or more of the corresponding item identifiers and each item identifier uniquely identifying a particular item within the plurality of Websites;
   generating, by the computer processor, a data structure in the networked computer from the database of Website organizational data, the data structure comprising a matrix including a plurality of entries, wherein
      each entry of the matrix comprising one of the corresponding item identifiers on a first axis of the matrix and one of the plurality of Website-specific category names on a second axis of the matrix, and
      each entry in the matrix indicates that the one of the corresponding item identifiers is organized under the one of the plurality of Website-specific category names;
   generating, by the computer processor, a reduced-rank classification structure in the networked computer from the data structure via a matrix decomposition including at least a singular-value decomposition of the data structure, wherein the reduced-rank classification structure combines the plurality of the Website-specific category names from multiple Websites of the plurality Websites into a single combined category-name grouping used to categorize content of the multiple Websites; and
   storing, by the computer processor, the reduced-rank classification structure at the networked computer.

2. The method of claim 1, wherein each of the plurality of the Website-specific category names comprises a unit of a Website's taxonomy or a tag.

3. The method of claim 1, wherein the generating the data structure comprises filling the matrix depending on a level of certainty that a specific item identifier corresponds with a specific Website-specific category name.

4. The method of claim 1, further comprising generating an approximation of the Website organizational data based on the reduced-rank classification structure.

5. The method of claim 4, wherein the generating the approximation of the Website organizational data comprises performing a sparse regression of the reduced-rank classification structure.

6. The method of claim 1, wherein the reduced-rank classification structure is used to generate a user profile.

7. The method of claim 1, wherein the reduced-rank classification structure represents a set of vectors corresponding to positions within a latent vector space.

8. The method of claim 7, further comprising mapping a new Website's organizational data to the latent space of the reduced-rank classification structure.

9. A computer system, comprising:
   a computer processor to execute computer-readable instructions;
   a storage device to store a database of Website organizational data received from a plurality of Websites, the Website organizational data comprising a plurality of Website-specific category names and corresponding item identifiers, wherein each of the plurality of Website-specific category names is associated with one or more of the corresponding item identifiers and each item identifier uniquely identifying a particular item within the plurality of Websites; and
   a memory device that stores instructions, executed by the computer processor, to direct the computer processor to:
      generate a data structure from the database of Website organizational data, the data structure comprising a matrix including a plurality of entries, wherein
         each entry of the matrix comprising one of the corresponding item identifiers on a first axis of the matrix and one of the plurality of Website-specific category names on a second axis of the matrix, and
         each entry in the matrix indicates that the one of the corresponding item identifiers is organized under the one of the plurality of Website-specific category names; and
      generate a reduced-rank classification structure from the data structure via a matrix decomposition including at least a singular-value decomposition of the data structure, wherein the reduced-rank classification structure combines the plurality of the Website-specific category names from multiple Websites of the plurality Websites into a single combined category-name grouping used to categorize content of the multiple Websites; and
      store the reduced-rank classification structure at the storage device.

10. The computer system of claim 9, wherein each of the plurality of the Website-specific category names comprises a unit of a Website's taxonomy or a tag.

11. The computer system of claim 9, wherein the generating the data structure comprises filling the matrix depending on a level of certainty that a specific item identifier corresponds with a specific Website-specific category name.

12. The computer system of claim 9, further comprising generating an approximation of the Website organizational data by performing a sparse regression of the reduced-rank classification structure.

13. The computer system of claim 9, wherein the reduced-rank classification structure is used to generate a user profile.

14. The computer system of claim 9, wherein the reduced-rank classification structure represents a set of vectors corresponding to positions within a latent vector space.

15. The computer system of claim 14, further comprising mapping a new Website's organizational data to the latent space of the reduced-rank classification structure.

16. A non-transitory computer-readable medium, comprising code configured to direct a computer processor to:
   obtain a database of Website organizational data at a networked computer from a plurality of Websites, the Website organizational data comprising a plurality of Website-specific category names and corresponding item identifiers, wherein each of the plurality of Website-specific category names is associated with one or more of the corresponding item identifiers and each item identifier uniquely identifying a particular item within the plurality of Websites;
   generate a data structure in the networked computer from the database of Website organizational data, the data structure comprising a matrix including a plurality of entries, wherein
      each entry of the matrix comprising one of the corresponding item identifiers on a first axis of the matrix and one of the plurality of Website-specific category names on a second axis of the matrix, and
      each entry in the matrix indicates that the one of the corresponding item identifiers is organized under the one of the plurality Website-specific category names; and
   generate a reduced-rank classification structure in the networked computer from the data structure via a matrix decomposition including at least a singular-value decomposition of the data structure, wherein the reduced-rank classification structure combines the plurality of the Website specific category names from multiple Websites of the plurality Websites into a single combined category-name grouping used to categorize content of the multiple Websites; and
   storing, by the computer processor, the reduced-rank classification structure at the networked computer.

17. The non-transitory computer-readable medium of claim 16, wherein the generating the data structure comprises filling the matrix depending on a level of certainty that a specific item identifier corresponds with a specific Website-specific category name.

* * * * *